(12) United States Patent
Ross

(10) Patent No.: US 11,836,526 B1
(45) Date of Patent: *Dec. 5, 2023

(54) PROCESSING DATA STREAMS RECEIVED FROM INSTRUMENTED SOFTWARE USING INCREMENTAL FINITE WINDOW DOUBLE EXPONENTIAL SMOOTHING

(71) Applicant: Splunk Inc., San Francisco, CA (US)

(72) Inventor: Joseph Ari Ross, Redwood City, CA (US)

(73) Assignee: Splunk Inc., San Francisco, CA (US)

(*) Notice: Subject to any disclaimer, the term of this patent is extended or adjusted under 35 U.S.C. 154(b) by 39 days.

This patent is subject to a terminal disclaimer.

(21) Appl. No.: 17/323,954

(22) Filed: May 18, 2021

Related U.S. Application Data

(63) Continuation of application No. 16/129,494, filed on Sep. 12, 2018, now Pat. No. 11,023,280.

(60) Provisional application No. 62/559,415, filed on Sep. 15, 2017.

(51) Int. Cl.
| | |
|---|---|
| *G06F 9/50* | (2006.01) |
| *G06F 11/30* | (2006.01) |
| *G06F 11/32* | (2006.01) |
| *G06F 11/34* | (2006.01) |
| *G06F 9/54* | (2006.01) |
| *G06F 16/2455* | (2019.01) |

(52) U.S. Cl.
CPC .......... *G06F 9/5016* (2013.01); *G06F 9/542* (2013.01); *G06F 11/3086* (2013.01); *G06F 11/323* (2013.01); *G06F 11/3409* (2013.01); *G06F 16/24568* (2019.01); *G06F 2201/81* (2013.01); *G06F 2201/835* (2013.01); *G06F 2201/865* (2013.01)

(58) Field of Classification Search
None
See application file for complete search history.

(56) References Cited

U.S. PATENT DOCUMENTS

| | | | |
|---|---|---|---|
| 6,745,150 B1 | 6/2004 | Brelman | |
| 6,993,458 B1 | 1/2006 | Castelli | |
| 7,280,988 B2 * | 10/2007 | Helsper | ............... G06F 11/3006 702/182 |

(Continued)

OTHER PUBLICATIONS

B. Kenmei, G. Antoniol and M. di Penta, "Trend Analysis and Issue Prediction in Large-Scale Open Source Systems," 2008 12th European Conference on Software Maintenance and Reengineering, 2008, pp. 73-82, doi: 10.1109/CSMR.2008.4493302 (Year: 2008).*

*Primary Examiner* — Abu Zar Ghaffari
(74) *Attorney, Agent, or Firm* — McDermott Will & Emery LLP

(57) ABSTRACT

A system receives a time series of data values from instrumented software executing on an external system. Each data value corresponds to a metric of the external system. The system stores a level value representing a current estimate of the time series and a trend value representing a trend in the time series. The level and trend values are based on data in a window having a trailing value. In response to receiving a most recent value, the system updates the level value and the trend value to add an influence of the most recent value and remove an influence of the trailing value. The system forecasts based on the updated level and trend values, and in response to determining that the forecast indicates the potential resource shortage event, takes action.

20 Claims, 12 Drawing Sheets

(56) References Cited

U.S. PATENT DOCUMENTS

| | | |
|---|---|---|
| 7,552,208 B2 | 6/2009 | Lubrecht |
| 7,698,113 B2 | 4/2010 | Steinbach |
| 8,010,324 B1 | 8/2011 | Crowe |
| 8,015,454 B1 | 9/2011 | Harrison |
| 8,499,066 B1 | 7/2013 | Zhang |
| 8,738,972 B1 | 5/2014 | Bakman |
| 9,176,789 B2 * | 11/2015 | Lowes ................ G06F 9/5083 |
| 10,205,640 B2 | 2/2019 | Chan |
| 10,397,900 B2 | 8/2019 | Bledsoe |
| 10,565,516 B2 | 2/2020 | Chen |
| 10,819,584 B2 * | 10/2020 | Li ........................ H04L 41/145 |
| 11,163,783 B2 * | 11/2021 | Melli ................ G06F 16/2477 |
| 2004/0220771 A1 * | 11/2004 | Breiman ............... G06Q 10/06 |
| | | 702/181 |
| 2005/0091147 A1 * | 4/2005 | Ingargiola ............. G06Q 40/06 |
| | | 705/37 |
| 2006/0010101 A1 | 1/2006 | Suzuki |
| 2007/0214261 A1 | 9/2007 | Kikuchi |
| 2010/0257133 A1 * | 10/2010 | Crowe ............... G06Q 30/0201 |
| | | 706/58 |
| 2012/0123981 A1 * | 5/2012 | Graves ................ G06F 16/2462 |
| | | 707/693 |
| 2012/0284713 A1 | 11/2012 | Ostermeyer |
| 2014/0222653 A1 * | 8/2014 | Takayasu ........... G06Q 30/0283 |
| | | 705/37 |
| 2014/0325072 A1 | 10/2014 | Zhang |
| 2015/0286507 A1 | 10/2015 | Elmroth |
| 2015/0302318 A1 * | 10/2015 | Chen ...................... G06N 20/00 |
| | | 706/14 |
| 2015/0378786 A1 | 12/2015 | Suparna |
| 2016/0103665 A1 | 4/2016 | Liu et al. |
| 2016/0103757 A1 | 4/2016 | Liu et al. |
| 2016/0105327 A9 * | 4/2016 | Cremonesi ............. G06N 5/022 |
| | | 703/13 |
| 2017/0249649 A1 | 8/2017 | Garvey |
| 2017/0339660 A1 | 11/2017 | Salunke |
| 2018/0060205 A1 | 3/2018 | Raj |
| 2018/0241812 A1 | 8/2018 | Marchetti |
| 2019/0266039 A1 * | 8/2019 | Ochiai .................... G05B 23/02 |
| 2019/0370610 A1 * | 12/2019 | Batoukov ........... G06F 11/0793 |
| 2020/0027014 A1 | 1/2020 | Wen |
| 2020/0034073 A1 | 1/2020 | Saha |

\* cited by examiner

1000

| | |
|---|---|
| 1. Select signal | Customize the settings for this alert |
| 2. Alert function | The signal disk.utilization (assumed to be increasing) is projected to increase to 100 in 24 hour(s) |
| | Alert Settings  Simulated events  Data Table |
| 3. Alert settings | Basic settings                                              *Signal resolution* [10s] |
| 4. Alert message | Alert when nearing ?  ○ Empty  ● Capacity |
| 5. Alert recipients | Capacity ? [100] |
| 6. Activate... | Trigger Sensitivity ? ● Low ○ Medium ○ High ○ Custom |

Advanced Settings
Trigger Threshold ? [24]
Trigger Duration ? [100] % of [15m]
Clear Threshold ? [36]
Clear Duration ? [100] % of [15m]
Use Double EWMA ? [Yes ▾]   — 1010

[ PROCEED TO ALERT MESSAGE ]

FIG. 10

PROCESSING DATA STREAMS RECEIVED FROM INSTRUMENTED SOFTWARE USING INCREMENTAL FINITE WINDOW DOUBLE EXPONENTIAL SMOOTHING

CROSS REFERENCE TO RELATED APPLICATION

This present application claims the benefit of priority under 35 U.S.C. 120 as a continuation of U.S. patent application Ser. No. 16/129,494, filed Sep. 12, 2018, now allowed, which claims the benefit of U.S. Provisional Application No. 62/559,415, filed on Sep. 15, 2017, the disclosures of which are hereby incorporated by reference in their entirety for all purposes.

BACKGROUND

This disclosure relates to data stream processing in general and more specifically to processing data streams received from instrumented software using incremental finite window double exponential smoothing.

Software developers monitor different aspects of software they develop by instrumenting the software. These aspects include performance of the software, disk utilization of the software, CPU utilization of the software, errors encountered during execution of the software, significant events encountered during execution of the software, information describing which parts of code are being executed and which parts are not being executed, and so on. After development, similar aspects of the software are also monitored during production, e.g., when software is being executed on a cloud architecture. One challenge developers face is capacity planning: an undersupply of computing resources, such as disk space, can lead to performance issues or outages, while an oversupply can be expensive.

Conventional techniques for capacity planning including using static thresholds and linear projections. Static thresholds monitor resource usage and provide alerts when the resource is running out and capacity should be added. A common approach is to trigger an alert when resource usage is above a total percentage of the available resource for a threshold amount of time (e.g., 80% of currently allocated disk space for 15 minutes). While this alerting scheme is simple to implement and easy to interpret, it leads to false positives and false negatives, even for applications with a consistent disk consumption rate. For example, a program running at 80% utilization but with a low rate of change of consumption may be able to proceed at the current resource allocation for a long time, whereas a program with a higher rate of change in resource consumption may need additional resources allocated sooner. Static thresholds do not express the urgency of an alert.

Linear projections consider the rate of change of resource consumption when generating alerts. As each data value is received, a rate of change from the previously received data value is calculated and used to forecast the amount of resource needed at some future time. If all or a high percentage of the projections calculated for a threshold period of time (e.g., all projections calculated during a 15 minute interval) indicate that additional resources will be needed at the future time, an alert is triggered. Linear projection is an improvement over the static threshold, but it can be fooled by certain data patterns. For example, if the data exhibits an overall upward trend but has short-term fluctuations in which the trend is downward or level, the set of calculated projections do not trigger the alert.

SUMMARY

To provide more reliable alerting for resource consumption, a double exponential smoothing method is used. Double exponential smoothing is a technique for modeling a level and a trend of a time series observed over a period of time. By modeling the trend over multiple data points, rather than determining the trends for individual data points, double exponential smoothing does not suffer from the consequences of local fluctuations as seen in linear projections.

To implement a double exponential smoothing process, an analysis system receives a time series with values $x_0, x_1, x_2, \ldots$, which may be a series of measurements of utilization of a computing resource being used by instrumented software. The analysis system models the level S of the series and the trend B of the series after each value is received. At a given time t at which data value $x_t$ is received, the analysis system calculates $S_t$ and $B_t$ based on their prior values, the value of $x_t$, and smoothing parameters $\alpha$ and $\beta$. The analysis system calculates a forecast level c periods in the future according to the formula $S_{t+c} = S_t + c\, B_t$. Based on the projection $S_{t+c}$, or a series of projections calculated over a period of time (e.g., 15 minutes), the analysis system can display an alert to a user, or trigger an automatic adjustment of computing resources for the instrumented software.

The analysis system calculates the model based on a moving window of data. Because the level S and trend B are determined iteratively based on prior values of S and B, in a simple implementation of double exponential smoothing, the values of S and B depend on the start time, i.e., the first observation for which S and B are calculated. The influence of old data values decays over time, but is not completely removed. Thus, in a simple implementation, the model is based on arbitrarily old data, and varies based on an arbitrary start time.

To provide consistency for visualization and alerting, as new data values are received, the analysis system calculates the model based on data within a moving window. As new data points are received, old data points fall out of the moving window, and the analysis system removes the influence of the data points outside the moving window. For example, the level S and trend B are based on the 1000 most recently received data points, or based on data points received over the 4 hours. To remove the influence of old data points, the analysis system maintains and updates a set of influence terms that represent influence of earlier level and trend values on the current level and trend values. As the window moves, the analysis system removes the oldest points and determines the influence of the removal of the point on the level and trend terms. The system then determines the value of the level S and trend B based on the updated data values of the moving window, including the newest point, and the influence terms.

One embodiment relates to a method for allocating system resources to instrumented software. An analysis system receives a time series including a plurality of data values from an instance of instrumented software executing on an external system with computing resources. Each of the plurality of data values corresponds to a metric related to a potential resource shortage event in the external system. The analysis system stores a level value representing a current estimate of the time series based on data for the time series in a window, and a trend value representing a trend in the time series based on the data in the window. The window has a leading value and a trailing value. In response to receiving a most recent value of the plurality of data values in the time series, the analysis system assigns the most recent value as the leading value in the window, retrieves the trailing value of the window, updates the level value to add an influence of the most recent value and to remove an influence of the trailing value, and updates the trend value to add an influence of the most recent value and to remove an influence of the trailing value. The analysis system calculates a forecast for the time series based on the updated level value and the updated trend value, and, in response to determining that the forecast indicates the potential resource shortage event, assigns additional resources of the external system to the instrumented software.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 10 shows a screenshot of a user interface allowing easy access to the double exponentially weighted moving average function, according to an embodiment.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Overall System Environment

Figure 1:
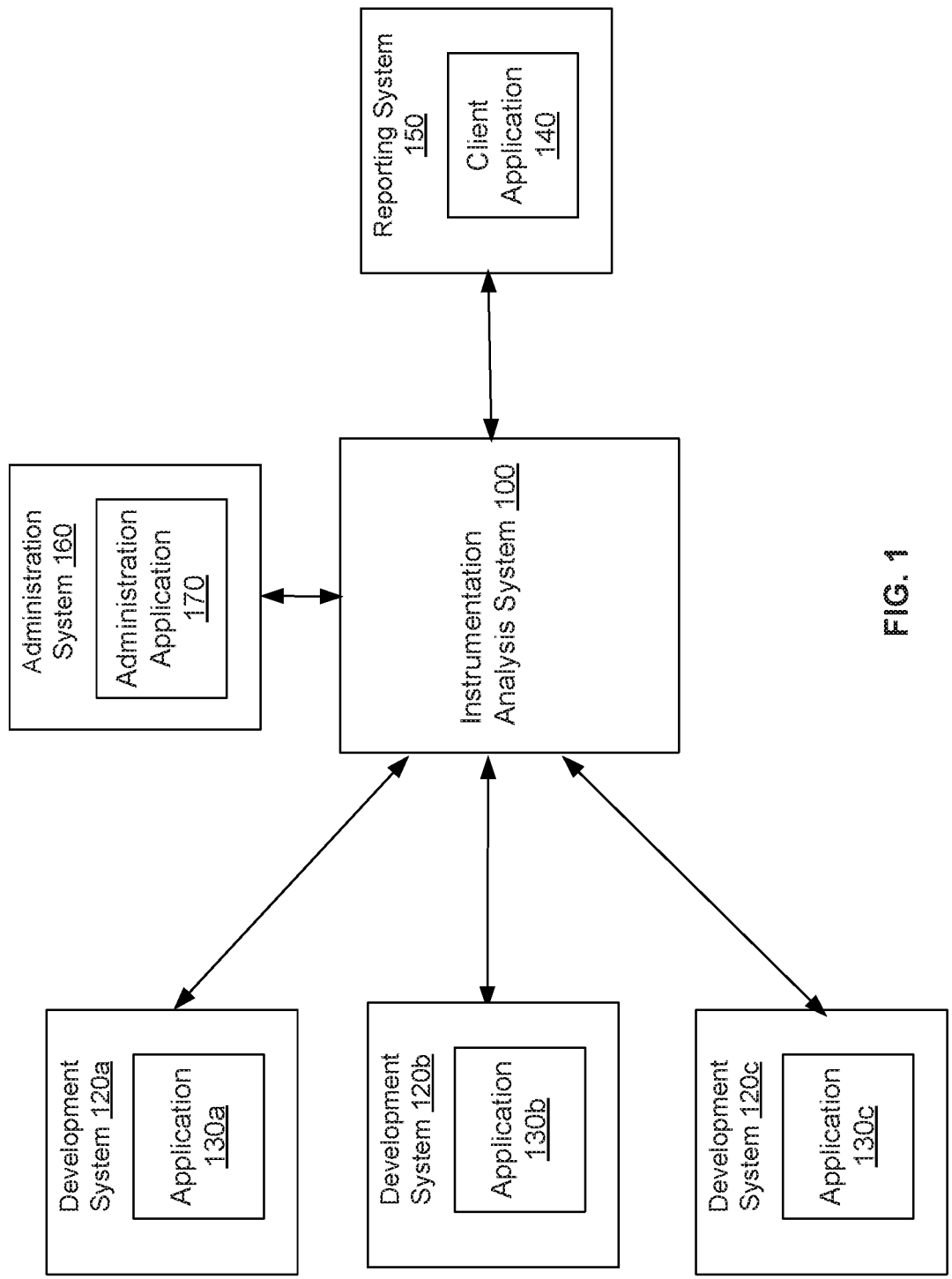
FIG. 1 shows the overall system environment for reporting based on instrumented software, according to an embodiment.

FIG. 1 shows the overall system environment for reporting based on instrumented software, according to an embodiment. The overall system environment includes an instrumentation analysis system 100, one or more development systems 120, an administration system 160, and a reporting system 150. In other embodiments, more or less components than those indicated in FIG. 1 may be used. For example, development system 120, administration system 160, and reporting system 150 may interact with instrumentation analysis system 100 via a network (not shown in FIG. 1). Furthermore, there may be more or less instances of each system shown in FIG. 1, for example, there may be multiple reporting systems 150.

FIG. 1 and the other figures use like reference numerals to identify like elements. A letter after a reference numeral, such as "130*a*," indicates that the text refers specifically to the element having that particular reference numeral. A reference numeral in the text without a following letter, such as "130," refers to any or all of the elements in the figures bearing that reference numeral (e.g. "130" in the text refers to reference numerals "130*a*" and/or "130*b*" in the figures).

The instrumentation analysis system 100 receives data comprising values of metrics sent by different development systems 120 (the instrumentation analysis system 100 may also be referred to herein as an analysis system or a data analysis system). A development system 120 executes instrumented software, for example, application 130. Although, application 130 is shown in FIG. 1 as an example of instrumented software, the techniques disclosed herein are not limited to application software but are applicable to other kinds of software, for example, server software, software executing on client devices, websites, and so on. Furthermore, a development system 120 comprises any computing system that is configured to execute instrumented software, whether or not it is used for development of new software. For example, the development system 120 may be a computing system used for testing purposes, staging purposes, or any production system executing in an enterprise.

The software executing on a development system 120 is configured to send information generated as a result of instrumenting the software to instrumentation analysis system 100. For example, the application 130 may send values corresponding to various metrics as they are generated to instrumentation analysis system 100. The application 130 may send group values of metrics and send them periodically to instrumentation analysis system 100. Different applications 130 may send the same metric or different metrics at different rates. The same application may send different metrics at different rates. The application 130 sends data to the instrumentation analysis system 100 by invoking application programming interface (API) supported by the instrumentation analysis system 100.

A software program may be instrumented to add counters or gauges to the application. A counter comprises instructions that store a value that is incremented upon occurrence of certain event in the software. The counter may be used to determine the number of times a particular part of the code is executed, for example, a function or a method, a particular branch of a conditional code, an exception, a loop, and so on.

Typically a counter value changes monotonically, for example, a counter value may increase (or decrease) monotonically. For example, if the counter tracks the number of times an event has occurred since the system started execution, the counter value increases each time the occurrence of the event is detected by the system. Values of a counter may be compared to determine the change in the particular counter value at two different points in time. For example, the number of times a particular event occurs within a time interval between times t1 and t2 may be determined by computing the change in a corresponding counter value from t1 to t2. The APIs of the instrumentation analysis system may be invoked by the application 130 to send the current value of the counter to the instrumentation analysis system 100.

Following is an example of instrumented code of an application 130. The following instruction included in the code being instrumented creates a counter object for tracking count of an action or entities.

counter1=createCounter(source="web1",
  metric="metric1");

The above instruction creates a counter object and assigns it to the variable counter1. The counter object is associated with a source "web1" and metric "metric1." In an embodiment, the source and the metric values uniquely identify the data stream associated with the counter (or a gauge). In other embodiments, more or fewer key value pairs may be used to uniquely identify a data stream.

One or more of the values specified during creation of a counter are received when data corresponding to the counter is sent by the instrumented code to the instrumentation analysis system 100. Embodiments allow the application 130 to be instrumented so as to reduce the amount of information sent with each data stream. This reduces the amount of overhead introduced in the application 130 as a result of instrumenting the code.

The instrumented code of application 130 may include instructions to update the counter value at various places in the code. For example, the counter counter1 may be incremented by executing the instruction "counter1.increment( )." The counter may be incremented to track various actions or entities associated with the code. For example, the counter may be incremented whenever a particular function or method is called, the counter may be incremented whenever a particular branch of a conditional expression is executed, the counter may be incremented whenever an object of a particular type is created, for example, in a constructor of an object. The increment instruction of the counter may be called conditionally, for example, if a function is invoked with a particular combination of parameters. The application 130 communicates the counter value to the instrumentation analysis system 100 by invoking an API of the instrumentation analysis system 100.

A gauge comprises instructions to measure certain runtime characteristics of the application 130, for example, heap size, number of cache misses or hits, active memory used, CPU (central processing unit) utilization, total time taken to respond to a request, time taken to connect to a service, and so on. A gauge may also be used to track certain application specific parameters or business related values, for example, number of transactions, number of users, and so on. The gauge may be invoked periodically based on an interval that is configurable. The value of the gauge is sent to instrumentation analysis system 100 periodically.

The administration system 160 allows a privileged user, for example, a system administrator to associate data streams with metadata. The administration system 160 comprises the administration application 170 that provides a user interface for a system administrator to specify the metadata. The metadata comprises properties, for example, name-value pairs. The instrumentation analysis system 100 receives metadata describing data streams and stores the metadata. The ability to specify metadata describing data streams independently from the data received from each data stream provides several benefits in generating reports based on the data stream.

As an example, the instrumentation analysis system 100 can receive modifications to metadata describing each data stream without requiring any modifications to the instrumented software of the application 130. As a result, the instrumentation analysis system 100 receives specifications of new reports and modifications to existing reports and generates results based on the new/modified reports without requiring the developers to modify applications 130.

This provides for a new paradigm for instrumenting software since the developers do not need to consider the types of reports that need to be generated while adding instructions to instrument the software. The developers simply instrument their software to generate raw data that can be combined in various ways in the generated report. Systems and methods for real time reporting based on instrumentation of software are described in the U.S. patent application Ser. No. 14/800,677, filed on Jul. 15, 2015 which is incorporated by reference hereby in its entirety.

Furthermore, the persons that are experts at generating the instrumented software can be different from the software developers. For example, an expert at data analysis who is not a developer can define the metadata for the data streams and generate reports without being involved in the development process. This is significant because the skills required for analyzing data are typically different from the skills required for developing software.

Furthermore, the instrumentation analysis system 100 can also receive and process reports built on top of existing reports by composing existing reports and adding new analytics functionality. The instrumentation analysis system 100 generates results of the new reports and sends them for presentation in real-time as the instrumentation analysis system 100 receives data streams from instrumented software. The instrumentation analysis system 100 generates these additional reports and modifies existing reports without requiring any modifications to the instrumented code of application 130.

Furthermore, the instrumentation analysis system 100 provides separation of the metadata describing the data streams from the data of the data streams. Accordingly, the amount of data that needs to be transmitted from the development systems 120 to the instrumentation analysis system 100 is reduced. Each application 130 transmits only the data values of the metrics and information identifying the metric. The metadata information is received separately from a source independent of the data source of the data streams. Accordingly, any amount of metadata may be introduced without increasing the amount of data of each data stream.

The reporting system 150 may be a client device. The reporting system 150 includes a client application 140 that allows a user to interact with the instrumentation analysis system 100. In an embodiment, the client application 140 is an internet browser, which may include client side code (e.g., Java Script) for accessing the instrumentation analysis system 100. In other embodiments, client application 140 is a proprietary application developed for interacting with the instrumentation analysis system 100.

The reporting system 150 can be a conventional computer system (e.g., a desktop or laptop computer), a tablet, or a device having computer functionality such as a personal digital assistant (PDA), a mobile telephone, a smart phone or another suitable device. The reporting system 150 interacts with instrumentation analysis system 100 via a network. The network may comprise any combination of local area and/or wide area networks, using both wired and/or wireless communication systems. In one embodiment, the network uses standard communications technologies and/or protocols.

The instrumentation analysis system 100 may be hosted on a computing system that includes one or more processors, memory, secondary storage and input/output controller. The computing system used for hosting the instrumentation analysis system 100 is typically a server class system that uses powerful processors, large memory, and fast input/output systems compared to a typical computing system used, for example, as a reporting system 150.

In an embodiment, data from several development systems 120 may be consolidated, for example, by a server and the combined data sent to the instrumentation analysis system 100. For example, an enterprise may install a server that receives data stream internally from different development systems 120 and sends the combined data in a batch form to the instrumentation analysis system 100 periodically. This allows efficiency of external communication from the enterprise. However this configuration may result in delay in communicating information to the instrumentation analysis system 100 and the corresponding delay in reporting data by the reporting system 150.

Associating Dimensions with Data Streams

A data stream may be identified by using a set of coordinates representing values of dimensions associated with data streams. A dimension refers to a property of data streams that can take one of a set of values. Each data stream may be associated with a value for a dimension. For example, a dimension can be a source of a data stream or a metric name associated with a data stream. A source of a data stream may be identified by a server name, a service name, and so on. Examples of metric names are cpu (central processing unit) load, cache misses, cache hits, and so on. A value of a dimension is also referred to as a coordinate value of the data stream. A coordinate value may be represented as a metadata attribute stored in the metadata store 230. Given the two dimensions of source and metric, a data stream may be identified by providing the two coordinates representing the source and the metric, for example, (server1, cpu_load) or (server2, memory_usage).

A data stream may be characterized by multiple dimensions (i.e., more than the two dimensions described above, i.e., source and metric name.) For example, if each server has multiple cpus, a dimension cpu_id may be included. Accordingly, each data stream obtained from a system may be characterized by (source_id, cpu_id, metric_name), i.e., a source identifier, a cpu identifier, and a name for the metric. Examples of data streams identified using three coordinates include (server1, cpu1, load), (server1, cpu2, load), (server2, cpu1, load), (server2, cpu2, load) and so on.

As another example of a dimension, a system may define customer name as a dimension. The name of the customer may be reported by the instrumented software, for example, based on the configuration parameters of the instrumented software executing on a development system 120. The customer name may be specified for the instrumented software using a system property. The instrumented software includes the customer name when it identifies a data stream associated with that particular customer. The ability to associate a data stream with a customer allows the instrumentation analysis system to perform customer specific analysis, for example, report on usages of systems for each customer, identify customers reporting more than a threshold number of errors and so on.

A data stream may be obtained from instrumented software or may be generated as a result of execution of blocks of a data stream language program within the instrumentation analysis system. A data stream may also comprise data stored in the instrumentation analysis system, for example, in a data store (such as a time series data store 260 described herein.) The data stream language is also referred to herein as the SignalFlow language.

System Architecture of the Instrumentation Analysis System

Figure 2:
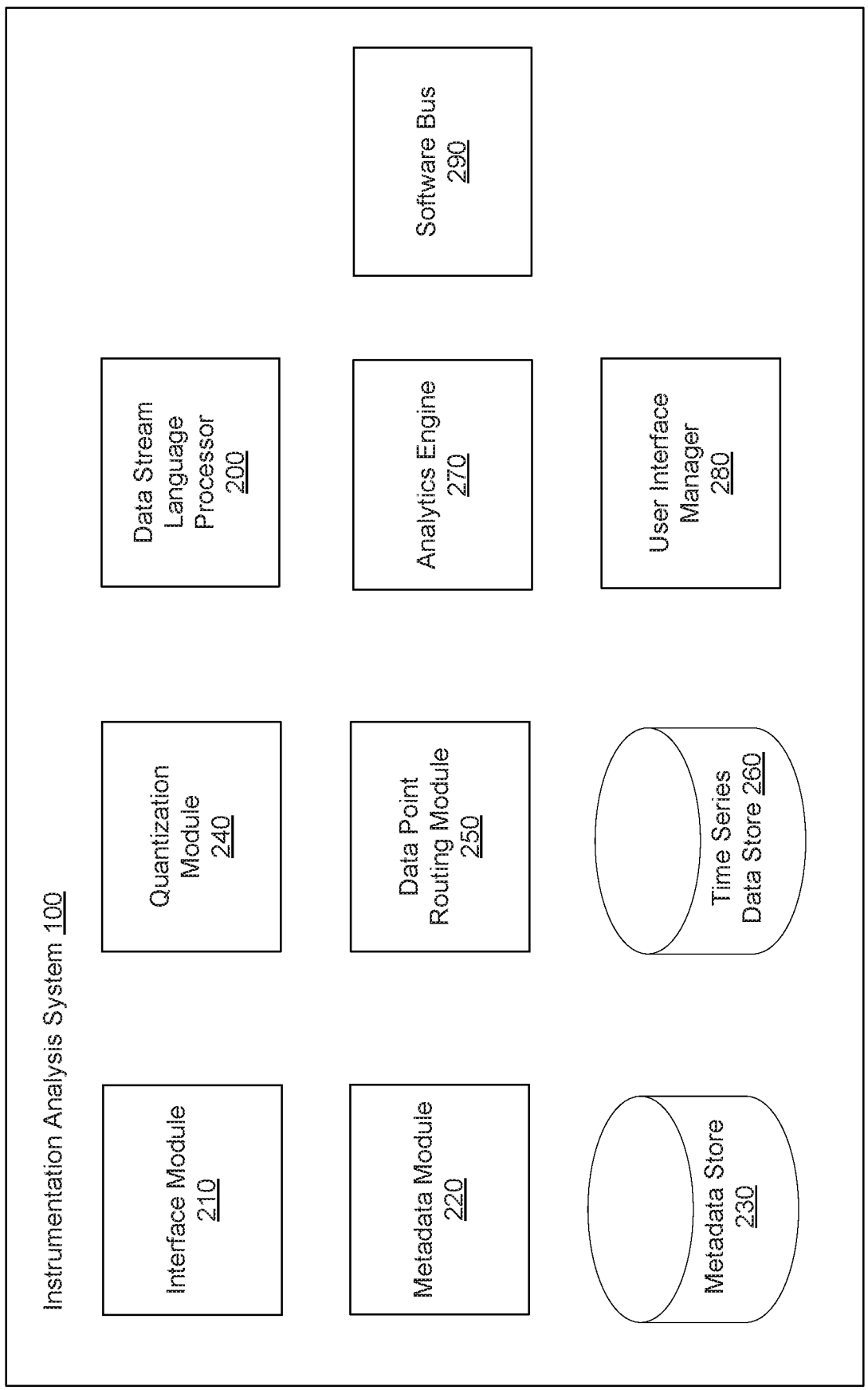
FIG. 2 shows the architecture of a system for executing a data stream language program for processing data streams received from instrumented software, according to an embodiment.

FIG. 2 shows the architecture of a system for executing a data stream language program for processing data streams received from instrumented software, according to an embodiment. The instrumentation analysis system 100 includes an interface module 210, a quantization module 240, metadata module 220, metadata store 230, a data point routing module 250, an analytics engine 270, a user interface manager 280, a data stream language processor 200, a time series data store 260, and software bus 290. In other embodiments, the instrumentation analysis system 100 may include other modules not described herein. Functionality indicated as provided by a particular module may be implemented by other modules instead.

The interface module 210 receives requests from external systems, for example, development systems 120 that communicate with the instrumentation analysis system 100. The interface module 210 supports various application programming interfaces (APIs) that external systems can invoke. The interface module 210 can receive and process data provided by applications 130 that are instrumented using functionality provided by different vendors, so long as the instrumented code sends the information in a format that can be processed by the interface module 210.

The interface module 210 receives data in the form of data streams from one or more development systems 120. In an embodiment, the interface module 210 receives data and represents the incoming data as tuples. Accordingly, each data stream is represented as a plurality of tuples, each tuple representing a data point. A tuple of data received by the interface module 210 comprises various elements. A tuple of data includes a metric identifier, for example, a name of the metric corresponding to the tuple and a value of the metric. The tuple of data received may further comprise other elements, for example, a timestamp corresponding to the time that the data was captured by the application 130 sending the data, one or more properties associated with the data.

In an embodiment, the timestamp associated with a tuple represents the time that the data value was received by the instrumentation analysis system 100. The properties associated with the data may be provided in the form of name, value pairs. These properties may provide additional information describing the data received, for example, information describing the source of the data such as a host name, server name, device name, or service name associated with the source, a method or function name associated with the data, an application instance identifier, and so on.

In an embodiment, the interface module 210 generates and assigns an identifier to records received by the interface module 210. The identifier is referred to herein as a time series identifier (also referred to herein as a TSID or tsid). A unique time series identifier is assigned to all tuples matching a metric name and a set of properties received with the tuple. Accordingly, a tuple (metric name, properties, metric value, timestamp) gets mapped to a tuple (tsid, metric value, timestamp). For example, if a tuple provides a metric name m1, and a hostname h1, all tuples with metric name m1 and hostname h1 are assigned the same time series identifier. Accordingly, the tsid uniquely identifies all tuples of a data stream received by the instrumentation analysis system 100.

The quantization module 240 processes data values received so as to transform an input time series of data in which data is available at arbitrary time intervals to a time series in which data is available at regular time intervals. For example, the data values received in an input time series may occur at irregular interval, however, the quantization module 240 processes the data of the time series to generate a time series with data occurring periodically, such as every second, or every 5 seconds, or every 15 seconds, and so on. This process is referred to herein as quantization of the time series. In an embodiment, the interface module 210 creates multiple threads or processes, each thread or process configured to receive data corresponding to a data stream. Each thread or process invokes the quantization module 240 to perform quantization of the data received for each data stream for each time interval. Systems and methods for quantization of data streams of instrumented software are described in the U.S. patent application Ser. No. 14/800,679, filed on Jul. 15, 2015 which is incorporated by reference hereby in its entirety.

The metadata module 220 receives and stores metadata information describing various data streams received from the development systems 120. In an embodiment, the metadata stored in the metadata module 220 is received from a user, for example, a system administrator interacting with the instrumentation analysis system 100 using the administration system 160.

The metadata may be represented as name-value pairs. In an embodiment, the metadata is represented as metadata objects, each object defining a set of properties that may be represented as name-value pairs. A set of data streams may be associated with the metadata object. Accordingly, all properties represented by the metadata object are associated with each data stream that is associated with the metadata object.

The metadata datastore 230 stores the metadata objects and their associations with the data streams. The metadata datastore 230 stores an identifier (ID) for each metadata object and the properties represented by the metadata object. In an embodiment, each data stream is associated with a time series identifier that uniquely identifies the data stream. The metadata datastore 230 stores an index that maps each metadata object to a set of time series identifier values. The metadata store 230 may receive instructions to modify a metadata object. For example, the metadata store 230 may receive instructions to modify, add or delete some properties represented by a metadata object. Alternatively, the metadata store 230 may receive instructions to modify the mapping from a metadata object to a data stream. For example, the metadata store 230 may receive instructions to associate a data stream with a metadata object or delete an association between a metadata object and a data stream.

In an embodiment, the metadata store 230 is represented as a relational database but may be represented as any other type of database or data store. For example, the metadata store 230 may be a relational database storing tables that map metadata object IDs to time series IDs identifying data streams. Other database tables may store the properties associated with each metadata object as a mapping from metadata object ID to each property represented as a name-value pair.

The user interface manager 280 renders the user interface for allowing users to specify the parameters of a data stream language program and to present results of execution of the data stream language program. The user interface manager 280 may display real-time results of a data stream language program as one or more charts that are periodically updated as the data of the data streams is received. The user interface manager 280 also presents a user interface that allows users to specify a data stream language program visually rather than textually. Examples of screenshots of user interfaces presented by the user interface manager 280 are described herein.

The time series data store 260 stores data received from various sources, for example, development systems 120. The time series data store 260 is also referred to herein as time series database (or TSDB.) In an embodiment, the time series data store 260 also stores the time series data after the data is quantized. The time series data store 260 may also store rollup data for each time series. The time series data store 260 also stores results of various analytics requests, for example, results of various reports requested by user. The analytics engine 270 computes results for certain reports, for example, moving averages over intervals of time by combining data stored in the time series data store 260 with new data obtained as data stream from various sources.

The software bus 290 provides a mechanism for modules of the instrumentation analysis system 100 to provide data of data streams to other modules of the instrumentation analysis system 100. A data stream language program may send a data stream to the software bus 290. Other modules, for example, fetch module 320, find module 310, window module 380, and so on can read the data from the software bus 290 and perform further processing on the data. For example, a data stream output of a data stream language program published on the software bus 290 may be identified by a find block of another data stream language program executing as a job.

The data stream language processor 200 executes programs specified using the data stream language. The data stream language processor 200 receives a data stream language program, parses the data stream language program to validate the program. The data stream language processor 200 generates a representation of the data stream language program and executes the data stream language program using the representation.

The requests specified using the data stream language is a query based on the metadata associated with data received from various development systems 120. The data stream language supports various types of analytic functions, for example, aggregations and transformations. The data stream language provides the ability to compose various functions including aggregations and transformations in various ways. In an embodiment, the data stream language processor 200 parses programs specified using the data stream language, generates an executable representation of the program, and executes the generated representation.

Data Stream Language

A program specified using the data stream language comprises units of computation called blocks. Each block is associated with a particular processing or computation performed by the data block. Each block may also have one or more input ports and one or more output ports. A block receives input via an input port, performs certain computation using the data and sends the result of the computation to the output port. This process is repeated at a pre-specified periodicity. Accordingly, an input port acts as a mechanism to provide data to the block and an output port acts as a mechanism to output data of the block.

In an embodiment, each block is associated with a type of the block. The type of the block determines the computation performed by the block. The types of blocks supported by the data stream language include a find block, a fetch block, a statistical computation block, a threshold block, and so on. A block may be associated with certain configuration parameters. For example, a find block may take an expression as input. A data stream language program includes instances of a type of block. For example, a find block with a particular search expression is an instance of the find block that is included in a data stream language program.

In an embodiment, an input port of a block is identified with character "?" and an output port is identified with character "!". Other embodiments may identify the input/output ports using other syntax. For example, if a block B1 has input ports in1 and in2, a specific input port (say in2) may be identified as "B1?in2". Similarly, if block B1 has output ports out1 and out2, a specific output port (say out2) can be specified as "B2!out2". If a block has a single input/output port, the data stream language program may not identify the port. For example, if block B2 has a single input port, the input port may be referred to as "B2". Similarly, if block B2 has a single output port, the output port may be referred to as "B2".

Two blocks may be connected by specifying that the output of one block is provided as input of the other block. Accordingly, a data stream language program can be considered a network of blocks. In an embodiment, the connection between two blocks is specified using an arrow between the two blocks. For example, if B1 and B2 both have a single input port and a single input port, "B1→B2" specifies that the output of B1 is provided as input of block B2. Similarly, if B1 has two output ports out1 and out2 and B2 has two input ports i1 and in2, the out1 port of B1 may be connected to the in2 port of B2 by the expression "B1!out1→B2?in2".

The data stream language processor 200 may execute multiple jobs based on a data stream language program. Each job may be associated with a start time, an end time, and a periodicity. Accordingly, the job is executed from the start time until the end time at intervals specified by the periodicity. The periodicity specifies the rate at which data is processed by the data stream language program. A user may specify different jobs for execution based on the same data stream language program, each job associated with different start time, end time, and periodicity.

Figure 3:
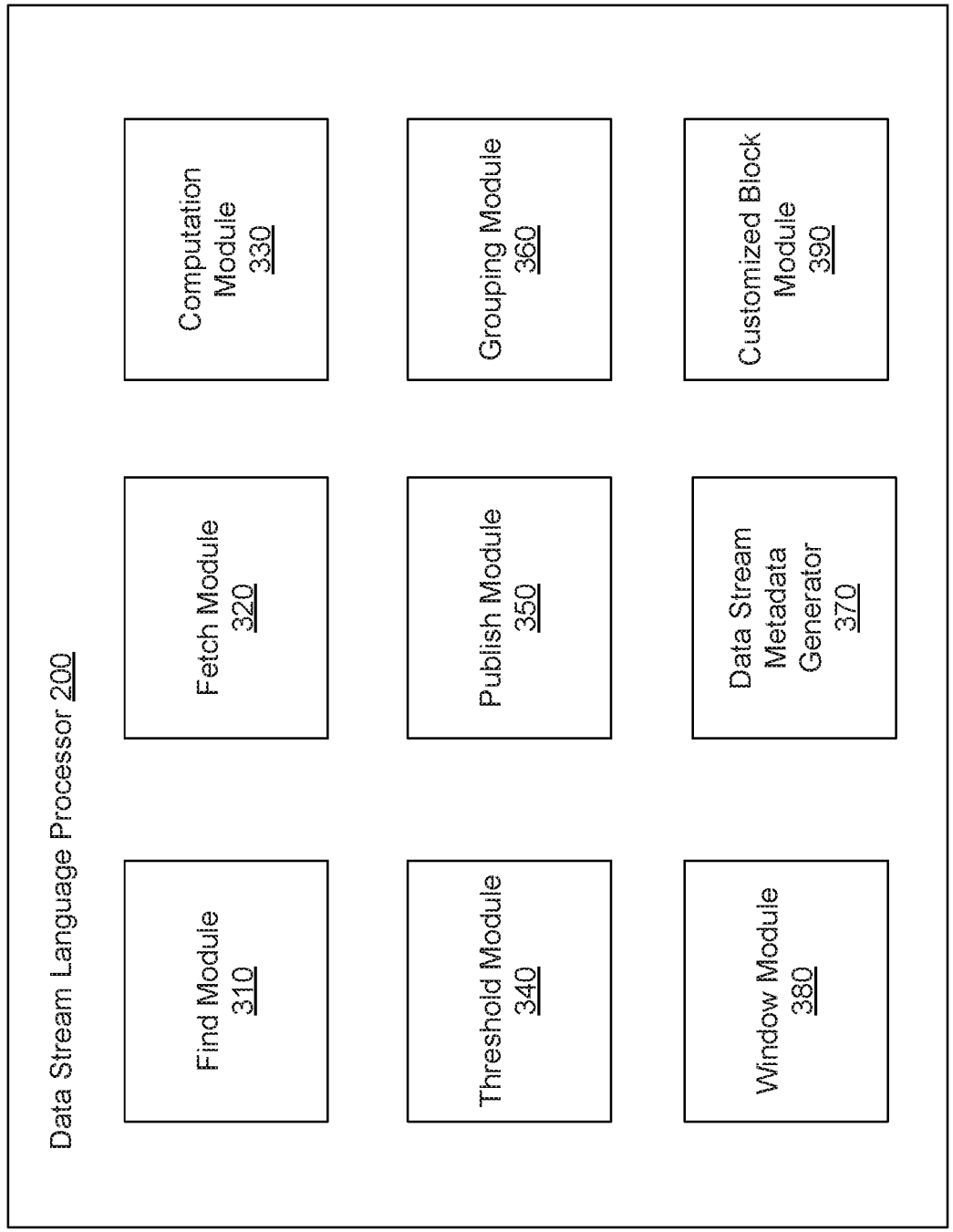
FIG. 3 shows the architecture the data stream language processor for processing blocks of data stream language programs, according to an embodiment.

FIG. 3 shows the architecture of the data stream language processor for processing blocks of data stream language programs, according to an embodiment. As shown in FIG. 3, the data stream language processor 200 includes modules for processing various types of blocks of the data stream language. Accordingly, the data stream language processor 200 includes a find module 310, a fetch module 320, a computation module 330, a threshold module 340, a publish module 350, a grouping module 360, a window module 380, a data stream metadata generator 370, and a customized block module 390. Other embodiments may include more or less modules than those shown in FIG. 3. Certain modules are not illustrated in FIG. 3, for example, a parser. The details of each module are further described herein along with details of the types of blocks processed by each module.

The find module 310 executes the find block to identify a set of data streams for processing by the rest of the data stream language program. The fetch module 320 fetches data from the identified data streams and provides the data for processing by subsequent blocks of the data stream language program. The computation module 330 performs statistical computations specified in the data stream language program, for example, mean, median, sum, and so on. The threshold module 340 compares data of an incoming data stream with a threshold value to determine if the incoming data exceeds certain bounds. The threshold value specified for comparison may dynamically change, for example, a threshold value may be specified as a one hour moving average of the input data stream scaled by certain factor. The publish module 350 executes the publish block that provides the output of the blocks preceding the publish block to various receivers including a user interface (e.g., a dashboard) for presenting the results, for storing in a database, or for providing to other blocks for further processing. The grouping module 360 performs grouping of data of input data streams to generate a set of result data streams corresponding to each group. The groups may be based on one or more attributes specified with the grouping command, for example, groups of data streams from each data center. The data stream metadata generator 370 generates metadata representing result data streams generated as a result of executing data stream language programs and stores the metadata in the metadata store 230 for allowing other components of the instrumentation analysis system 100 to use the result data stream. The customized block module 390 processes user defined blocks (customized blocks) in a data stream language program.

Example Data Stream Language Program

Figure 4:
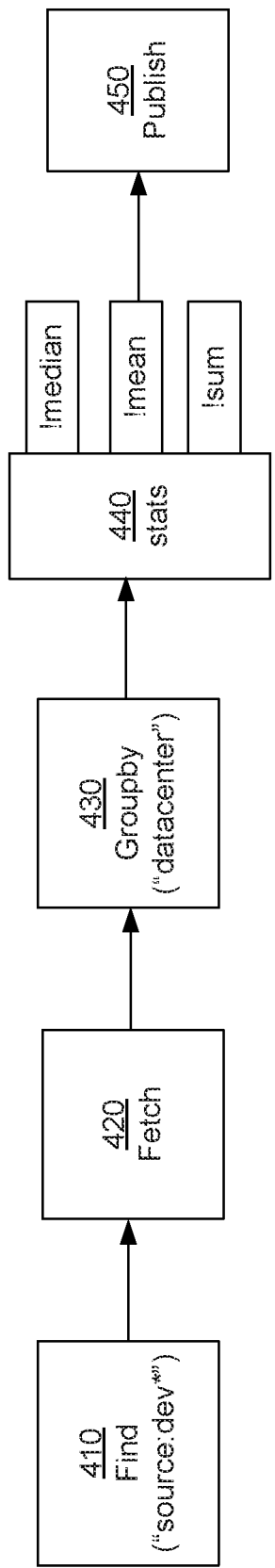
FIG. 4 shows an example of a data stream language program for illustrating features of the data stream language, according to an embodiment.

FIG. 4 shows an example of a data stream language program for illustrating features of the data stream language, according to an embodiment. FIG. 4 represents the data stream language program in terms of blocks. The data stream language program shown in FIG. 4 can be specified as follows.

```
find("source:analytics*") → fetch
                            → groupby("datacenter")
                            → stats!mean
                            → publish
```

The first block of the above data stream language program is a find block 410 that takes a string parameter that specifies a search expression. The find block finds a set of data streams received by the instrumentation analysis system 100 that satisfy the search expression. For example, the find block 410 takes search expression "source:dev" that identifies all data stream that the "source" metadata attribute value "dev." For example, an enterprise may associated all development systems with source value "dev." The output of the find block is provides as input to a fetch block 420.

The fetch block 420 retrieves data from the data streams identified by the find block. The fetch block receives data at a pre-specified periodicity. The fetch block may receive real time data of data streams received by the interface module 210 and quantized by the quantization module 240. The fetch block 420 may also receive data of data streams stored in the time series data store 260. The output of the fetch block 420 is provided as input to the groupby block 430.

The groupby block 430 takes names of one or more attributes of data streams as input. The groupby block 430 groups the data streams by the specified attributes. As shown in the example above, the groupby block 430 takes a "datacenter" attribute as input and groups the data streams by their datacenter value. Accordingly, data of all data streams having the same data center is grouped together. The groupby block 430 outputs a data stream corresponding to each value of data center. The output of the groupby block 430 is provided as input to the stats block 440 (which is a type of statistical computation block).

The stats block 440 has multiple outputs, for example, mean, median, sum, and so on. Each output port provides values based on the type of computation specified by the name of the output. The stats block 440 computes the mean value for each group of data streams received as input from the groupby block 430. Accordingly, the stats block 440 determines the mean of data received from data streams of each datacenter. As shown in FIG. 4, the mean output port of the stats block provides input to the publish block 450.

The publish block 450 may be configured to publish the received input on a dashboard. The publish block may be configured to publish the data on the software bus 290. The software bus 290 provides the data to all other modules of the instrumentation analysis system 100. The data stream language processor 200 executes the various blocks specified above at a periodicity specified for the data stream language program.

In some embodiments, the data stream language program includes instructions for smoothing one or more data streams. The smoothing operator may be applied to data streams received from instrumented software or to data streams that are generated by a data stream language program. The smoothing operator is implemented using double exponential smoothing techniques disclosed herein.

Overall Process of Execution of a Data Stream Language Program

Figure 5:
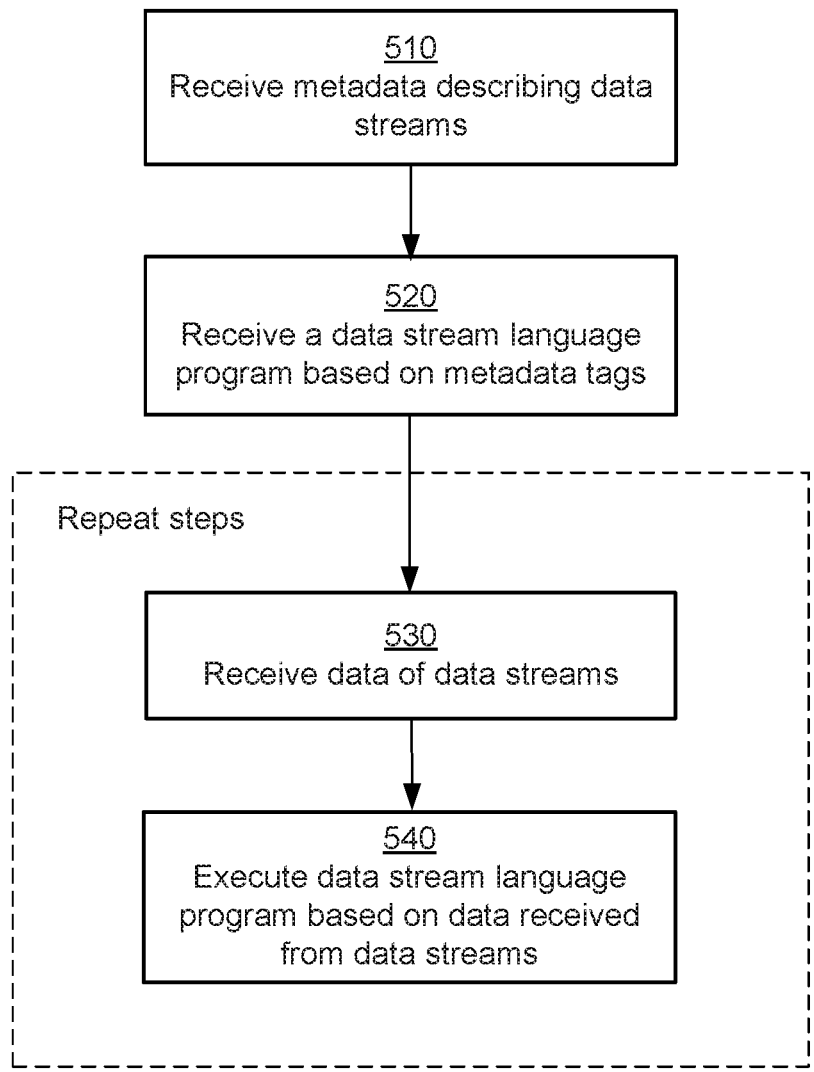
FIG. 5 shows the overall process of an instrumentation analysis system for processing data received from data streams based on a data stream language program, according to an embodiment.

FIG. 5 shows the overall process of an instrumentation analysis system for processing data received from data streams based on a data stream language program, according to an embodiment. The metadata module 220 receives 510 metadata describing data streams. The metadata definition is received independent of the data of the data streams themselves. For example, the data stream may simply provide tuples comprising a data value and a timestamp associated with the data value without providing any properties (for example, name-value pairs.) The metadata module 220 receives the properties describing the data streams from a source different from the source providing the data stream. For example, the data streams are provided by instances of instrumented software that is executing on development system 120, whereas the metadata definition may be provided by a system administrator via the administration system 160.

The analytics engine 270 receives 520 a data stream language program using the metadata attributes describing data streams. The data stream language program may represent a set of instructions provided to the instrumentation analysis system 100 to generate reports describing the instrumented software and provide the results in real-time, i.e., as the data of the data streams is received.

The instrumentation analysis system 100 repeats the following steps as data of various data streams is received by the instrumentation analysis system 100 from various development systems 120. The interface module 210 receives 530 data of different data streams. In an embodiment, the interface module 210 waits for a fixed interval of time, for example, 1 second or a few seconds and collects data received from different data streams. In an embodiment, the quantization module 240 performs quantization of the data for each incoming data stream for each time interval. Accordingly, data from each data stream is aggregated into a single value associated with the data stream for that time interval.

The analytics engine 270 executes 540 the data stream language program based on the data of the data streams for the time interval. If the data is quantized for each data stream, the analytics engine 270 executes 540 the data stream language program using the quantized values from each data stream. The data stream language program may include a publish block that causes the analytics engine 270 to send the result(s) of evaluation of the data stream language program for presentation, for example, to a user interface.

The data stream language program may generate one or more data streams. The analytics engine 270 also stores the data streams generated as a result of evaluation of the data stream language program, for example, in the time series data store 260. The analytics engine 270 creates one or more new data streams (or time series) representing the results of the data stream language program. The new data streams are stored in the time series data store 260. This allows the result of the data stream language program to be used as input to other data stream language program. For example, a data stream language program may generate data representing the $95^{th}$ percentile of values received from a plurality of data streams. The result of the data stream language program may be stored in the time series data store 260 as a new data stream. The analytics engine 270 may further execute another data stream language program that computes a moving average value based on the generated data stream.

User Interface for Generating Reports Using Data Stream Language Programs

In some embodiments, the instrumentation analysis system 100 provides a user interface that generates data stream language programs for the end user interested in viewing the reports based on data streams. The user is provided with a user friendly user interface that hides the complexity of the data stream language. The user interface provided by the instrumentation analysis system shows various widgets that allow users to take actions such as select the metrics for generating reports, performing rollups, grouping data streams and so on.

Figure 6:
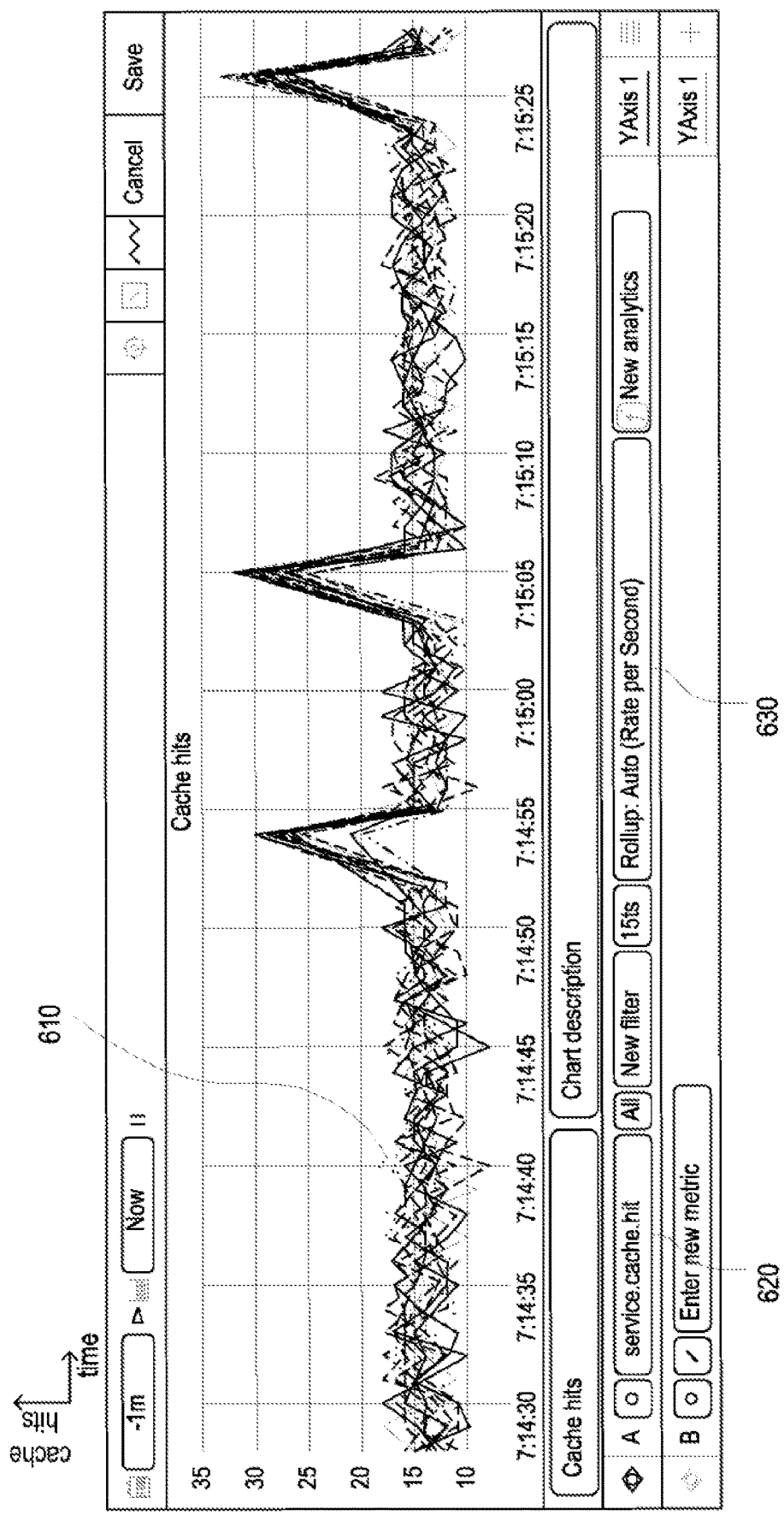
FIG. 6 shows a screenshot of a user interface displaying result of execution of a data stream language program that shows data streams received by the instrumentation analysis system, according to an embodiment.

FIG. 6 shows a screenshot of a user interface displaying result of execution of a data stream language program that shows data streams received by the instrumentation analysis system, according to an embodiment. The screenshot shows several charts 620 displaying data streams representing metric 620 service.cache.hits. The metric represents cache hit values received from instrumented software executing on development systems 120. The values are rolled up to a time interval of 1 second. Accordingly, the cache hits values received in each time interval of one second are added together. There can be a large number of services reporting the metric service.cache.hits and accordingly a large number of charts 620 is displayed. FIG. 6 shows various widgets that allow a user to take actions, for example, select the metric that is reported by the user interface, perform rollups.

Figure 7:
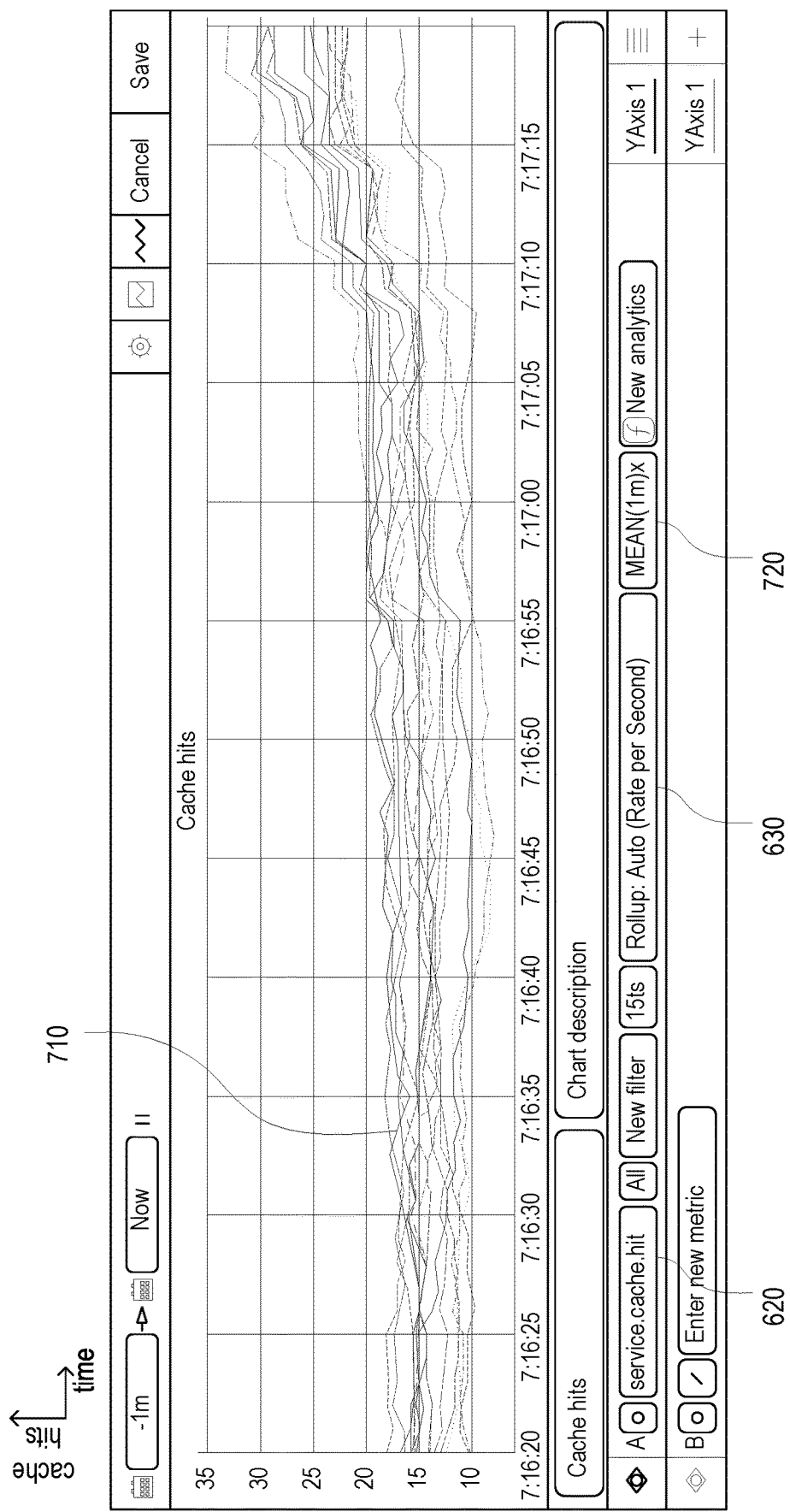
FIG. 7 shows a screenshot of a user interface displaying result of execution of a data stream language program showing 1 minute average of data of data streams received by the instrumentation analysis system, according to an embodiment.

FIG. 7 shows a screenshot of a user interface displaying result of execution of a data stream language program showing 1 minute average of data of data streams received by the instrumentation analysis system, according to an embodiment. FIG. 7 shows a widget that allows a user to specify certain computations to be performed on the data streams. Specifically, FIG. 7 shows a widget 720 that computes a one minute mean for each data stream. As a result the charts 710 are smoother than the charts shown in FIG. 6. However the number of charts 710 shown in FIG. 7 is same as the number of charts 610 shown in FIG. 6.

Processing a Time Series Using Double Exponential Smoothing

In some embodiments, the instrumentation analysis system 100 forecasts a future value based on received time series data using double exponential smoothing. For example, the data stream language processor 200 receives a data stream language program with instructions for processing a time series using double exponential smoothing with a moving window. The fetch module 320 fetches data in the time series (e.g., newly received data values, and any data values to be removed from the window) received from a development system 120. The computation module 330 computes an updated model based on the fetched data and the model calculated from a prior iteration, and computes a forecast for the time series based on the updated model. The threshold module 340 compares the forecast to one or more thresholds. If the forecast exceeds an upper threshold or is below a lower threshold, the publish module 350 publishes an alert. Alternatively, if a threshold is reached, the interface module 210 transmits an instruction to the development system 120 to adjust the resources allotted to the application 130 to which the time series relates.

The time series may relate to resource utilization of an application 130 executing on a development system 120. For example, the data values in the time series may be a measurement of processing resources (e.g., CPU utilization) or memory resources (e.g., disk utilization) currently used by the application 130. For example, the application 130 may be allotted a particular amount of disk space, and each data value in the time series represents a percentage of the allotted disk space being used by the application 130. If the instrumentation analysis system 100 determines that the disk space for running the application 130 is projected to exceed the available disk space, the instrumentation analysis system 100 may trigger an alert to a software developer or system administrator, who reallocates disk space based on the alert. Alternatively, the instrumentation analysis system 100 generates and transmits an instruction to the development system 120 to allocate additional disk space for the application 130. Similarly, if the instrumentation analysis system 100 determines that the application 130 is projected to use significantly less disk space than is currently allocated, the instrumentation analysis system 100 may trigger an alert or transmit an instruction to the development system 120 that the application 130 can be allocated less disk space.

To calculate a reliable projection of a computing resource based on a time series, the instrumentation analysis system 100 (e.g., the computation module 330) performs a double exponential smoothing process on a moving window of the received time series data. Double exponential smoothing models two quantities associated with a real-valued time series: the level of the series, denoted $S_t$; and the trend of the series, denoted $B_t$. In a general case, for a time series $x_0, x_1, x_2, \ldots$, $S_1$ is initialized as $x_1$, and $B_1$ is initialized as $x_1 - x_0$. For $t \geq 2$, $S_t$ and $B_t$ are defined as follows:

$$S_t = \alpha x_t + (1-\alpha)(S_{t-1} + B_{t-1}) \quad (1)$$

$$B_t = \beta(S_t - S_{t-1}) + (1-\beta)B_{t-1} \quad (2)$$

In the above formulas, $\alpha \in (0, 1]$ is a smoothing parameter for the level term, and $\beta \in (0, 1]$ is a smoothing parameter for the trend term. The instrumentation analysis system 100 computes a forecast of the time series for a time c periods in the future by calculating $S_{t+c} = S_t + c\, B_t$.

When $S_t$ and $B_t$ are calculated according to formulas (1) and (2) above, the influence of a data point decays as time passes, but is never eliminated. As a consequence, the result of double exponential smoothing depends on the "start time" of the computation. This can lead to inconsistencies in the display of an instrumentation analysis system 100. For example, if the model and/or forecasts are calculated based on data displayed by the publish module 350, the level of zoom (e.g., changing the displayed window from the past 4 hours to the past 12 hours) can change the model and the forecast. The dependency on the start time can also lead to inconsistencies between systems. For example, if two different systems, e.g., two instrumentation analysis systems, or the instrumentation analysis system 100 and the development system 120, begin receiving the time series data at different start times, the two systems can have different models. Furthermore, if the computation depends on the start time of the time series, whether an alert is triggered can depend on arbitrarily old data. To address these problems, the instrumentation analysis system 100 implements an implementation of double exponential smoothing using a finite window, e.g., exactly the last 2 hours or 4 hours of data, or exactly the last 1000 or 5000 data points.

To calculate $S_t$ and $B_t$ for a finite window using the formulas (1) and (2), the instrumentation analysis system 100 could, for each iteration, calculate S and B for the earliest data point currently in the window, followed by the second data point, and so forth, until the most recent data point is reached. This involves a large amount of computation that may not be possible to perform in real-time as new data values are received, e.g., if a new data value is received each second. The computational load becomes very large if projections for multiple time series are computed simultaneously, e.g., for each of the applications 130; it may be difficult or impossible to calculate an exponentially smoothed form of the time series received from each applications 130 using this method. Furthermore, if a developer wishes to aggregate data streams in ad hoc ways, it may be difficult or impossible to express an exponentially smoothed form of the aggregation as an aggregation of the exponentially smoothed form of its constituents (e.g., if the aggregation to be exponentially smoothed is the maximum value of a set of data streams). To enable efficient calculation of an exponentially smoothed time series, the instrumentation analysis system 100 performs a process for adding a most recent data point in the time window, and removing the oldest data point in the time window, based on the prior values of S and B, but without re-calculating the intermediate values of S and B. FIGS. 8A-8E graphically illustrate the process for double exponential smoothing using a moving window.

Figure 8A:
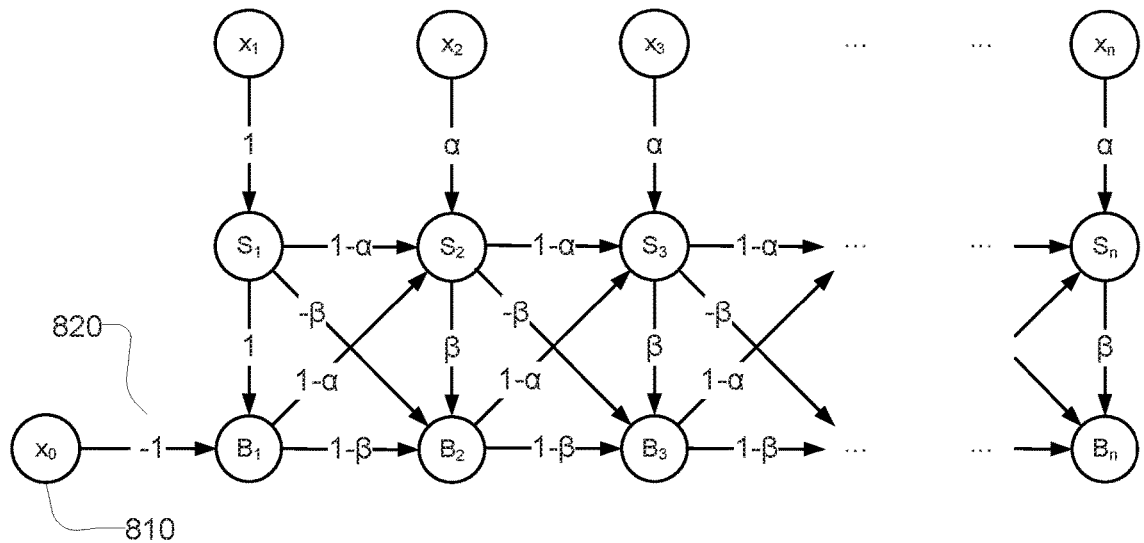
FIGS. 8A-8E are a graphical illustration of a process for double exponential smoothing using a moving window, according to an embodiment.

FIG. 8A represents the sequence of update steps for calculating S and B for a data window having n data points as a directed acyclic graph. Each vertex, such as vertex 810, is labeled with the quantity it represents. Edges, such as edge 820, are labeled with edge weights. Edge weights represent multiplication, e.g., the edge 820 represents the edge weight $-1$ times the quantity in the vertex 810, $x_0$. Multiple incoming edges are summed. For example, $B_1$ is equal to $(-1)$ $(x_0)+(1)(S_i)$. The full graph shown in FIG. 8A carries out the smoothing algorithm based on formulas (1) and (2) for the time series $x_0, x_1, x_2, \ldots, x_n$.

When a new data point $x_{n+1}$ is received, the instrumentation analysis system 100 assigns the new data point $x_{n+1}$ as the leading value in the window. This is shown graphically in FIG. 8B. The new column 830 includes the data point $x_{n+1}$, the updated level value $S_{n+1}$, and the updated trend value $B_{n+1}$. The instrumentation analysis system 100 uses formulas (1) and (2) above to add the new data point $x_{n+1}$ to the updated level value $S_{n+1}$ and the updated trend value $B_{n+1}$.

Figure 8B:
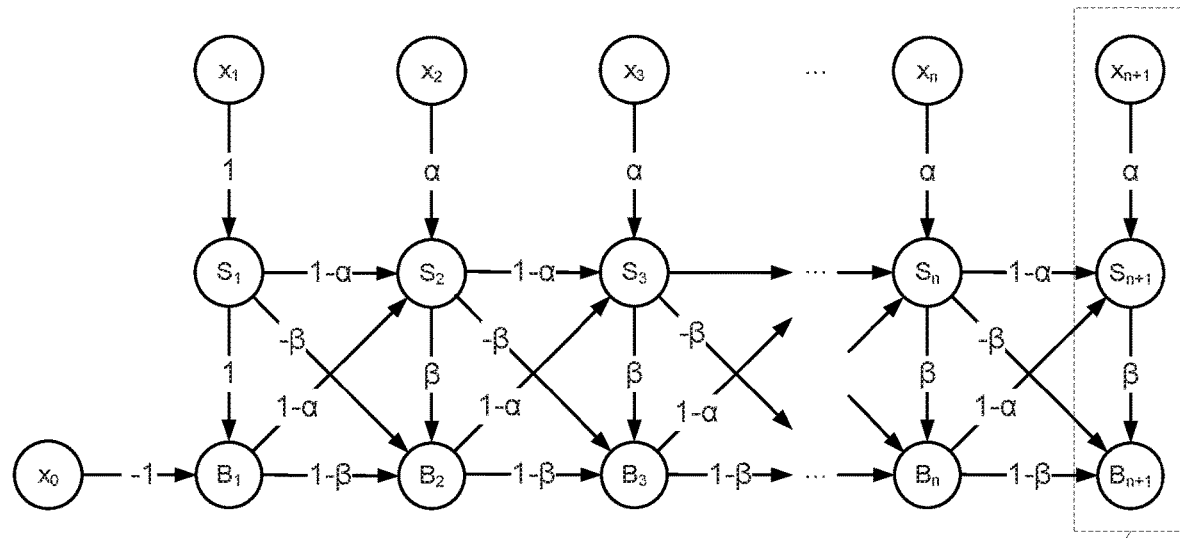

In the graph shown in FIG. 8B, the updated level value $S_{n+1}$ and the updated trend value $B_{n+1}$ still include the influence of the trailing data value $x_0$ and the earliest level and trend values, $S_1$ and $B_1$. When the new data point $x_{n+1}$ is assigned as the leading as the leading value in the data window, the moving window drops the trailing data value $x_0$, so the instrumentation analysis system 100 performs additional steps illustrated in FIGS. 8C-8E to remove the influence of the old trailing value and the earliest level and trend values. After these steps, the updated level value $S_{n+1}$ and the updated trend value $B_{n+1}$ are based only on the data in the moving window.

To remove the influence of the trailing data value without recalculating each of the intermediate level values and trend values, the instrumentation analysis system 100 maintains and utilizes a set of influence terms that indicate the influences on the level value and the trend value of the earliest level value and trend value in the window. The influence terms can be expressed as dS/dS (the influence of the earliest level value in the window on the current level value, e.g., $dS_n/dS_1$ in FIG. 8A, or $dS_{n+1}/dS_1$ in FIG. 8B), dB/dS (the influence of the earliest level value in the window on the current trend value, e.g., $dB_{n+1}/dS_1$ in FIG. 8B), dS/dB (the influence of the earliest trend value in the window on the current level value, e.g., $dS_{n+1}/dB_n$ in FIG. 8B), and dB/dB (the influence of the earliest trend value in the window on the current trend value, e.g., $dB_{n+1}/dB_1$ in FIG. 8B).

The instrumentation analysis system 100 may also store two variables $T_0$ and $T_1$ representing the two trailing values at any given time. For example, for the window shown in FIG. 8B, the trailing value is $x_0$, and the second trailing value (i.e., the value subsequent to the trailing value) is $x_1$. During each iteration, the instrumentation analysis system 100 may retrieve the two trailing values $x_0$ and $x_1$ by accessing the variables $T_0$ and $T_1$. Each iteration, the instrumentation analysis system 100 retrieves an additional trailing value, and reassigns the variables $T_0$ and $T_1$ each to a later trailing value. For example, at the beginning of the illustrated iteration, $T_0=x_0$ and $T_1=x_1$; at the beginning of the following iteration, $T_0=x_1$ and $T_1=x_2$; and so forth.

Figure 8C:
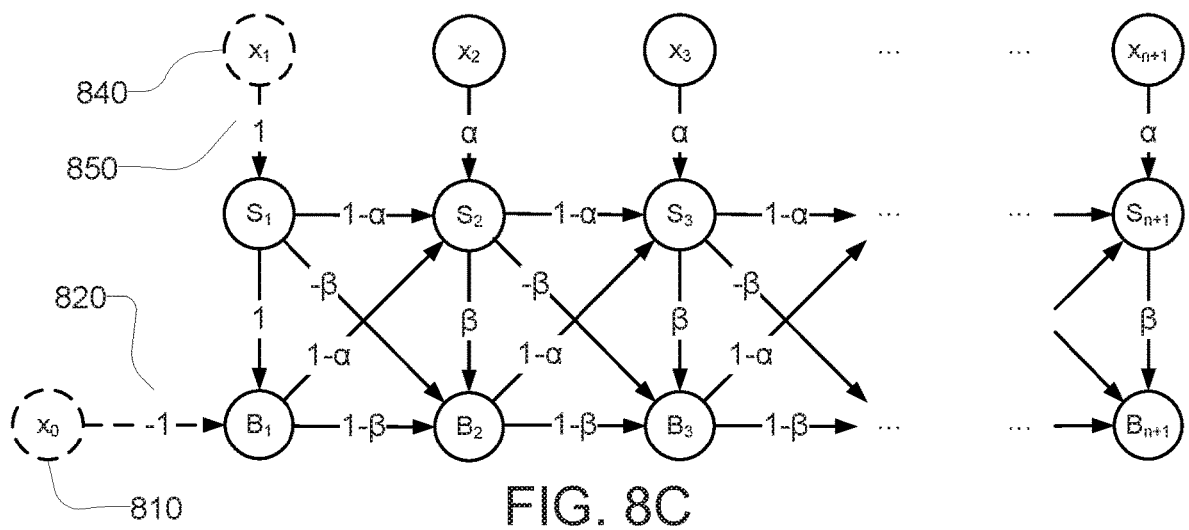

In the step shown in FIG. 8C, the influences of the trailing value $x_0$ and the second trailing value $x_1$ are removed. In FIG. 8C, the trailing value $x_0$ and the second trailing value $x_1$ are represented by vertices 810 and 840. The vertices 810 and 840 and the edges 820 and 850 are shown in dashed lines in FIG. 8C, indicating that these vertices and edges are to be removed from the graph. Mathematically, the instrumentation analysis system 100 removes the trailing value $x_0$ and the second trailing value $x_1$ from the current values of S and B (i.e., the values of $S_{n+1}$ and $B_{n+1}$ after data value $x_{n+1}$ was added in FIG. 8B) using the following equations:

$$S = S + x_0(dS/dB) - x_1(dS/dS) \tag{3}$$

$$B = B + x_0(dB/dB) - x_1(dB/dS) \tag{4}$$

In the above equations, the terms $x_0$ (dS/dB) and $x_0$ (dB/dB) have the effect of changing the weight of the edge 820 leading to the vertex labeled $B_1$ from −1 to 0. The terms $x_1$ (dS/dS) and $x_1$ (dB/dS) have the effect of changing the weight of the edge 850 from 1 to 0. This results in the graph shown in FIG. 8D.

After the trailing value $x_0$ and the second trailing value $x_1$ are removed, the instrumentation analysis system 100 updates the influence terms dS/dS, dS/dB, dB/dS, and dB/dB so that they indicate the influences on the level value and the trend value of a second earliest level value and second earliest trend value in the window, e.g., $S_2$ and $B_2$ in FIG. 8C. The influence terms $dS_{n+1}/dS_2$, $dS_{n+1}/dB_2$, $dB_{n+1}/dS_2$, and $dB_{n+1}/dB_2$ can each be expressed in terms of $dS_{n+1}/dS_1$, $dS_{n+1}/dB_1$, $dB_{n+1}/dS_1$, and $dB_{n+1}/dB_1$. The updated influence terms are calculated as follows:

$$\frac{dS}{dB} = 2\frac{dS}{dB}_{prev} - \frac{dS}{dS}_{prev} \tag{5}$$

$$\frac{dS}{dS} = \frac{(2\beta-1)\frac{dS}{dB}_{prev} + (1-\beta)\frac{dS}{dS}_{prev}}{1-\alpha} \tag{6}$$

$$\frac{dB}{dB} = 2\frac{dB}{dB}_{prev} - \frac{dB}{dS}_{prev} \tag{7}$$

$$\frac{dB}{dS} = \frac{(2\beta-1)\frac{dB}{dB}_{prev} + (1-\beta)\frac{dB}{dS}_{prev}}{1-\alpha} \tag{8}$$

$$\frac{dS}{dS} = \frac{dS}{dS} + (1-\beta)\frac{dS}{dB} \tag{9}$$

$$\frac{dB}{dS} = \frac{dB}{dS} + (1-\beta)\frac{dB}{dB} \tag{10}$$

Figure 8D:
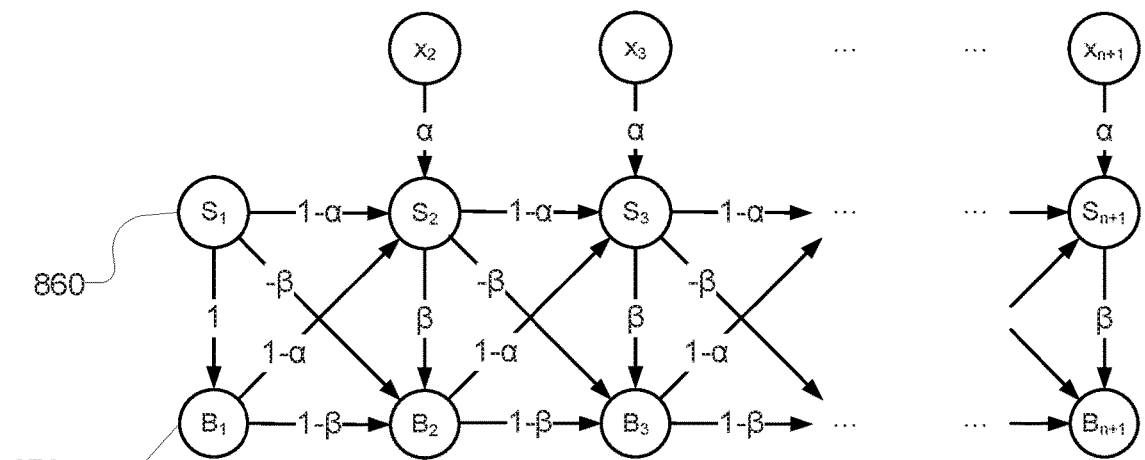

After the influence terms have been updated, the instrumentation analysis system 100 discards the vertices for $S_1$ and $B_1$, labeled 860 and 870 in FIG. 8D, and adds a vertex for $x_1$. In addition, the weight on the edge from $x_2$ to $S_2$ is changed from α to 1. To adjust the weight on this edge, the instrumentation analysis system 100 retrieves the third trailing data value $x_2$ from storage, e.g., from the time series data store 260. If the instrumentation analysis system 100 stores two previously-retrieved trailing values during each iteration, the third trailing data value $x_2$ is the only value that the instrumentation analysis system 100 retrieves from storage, which results in fast computation time.

Figure 8E:
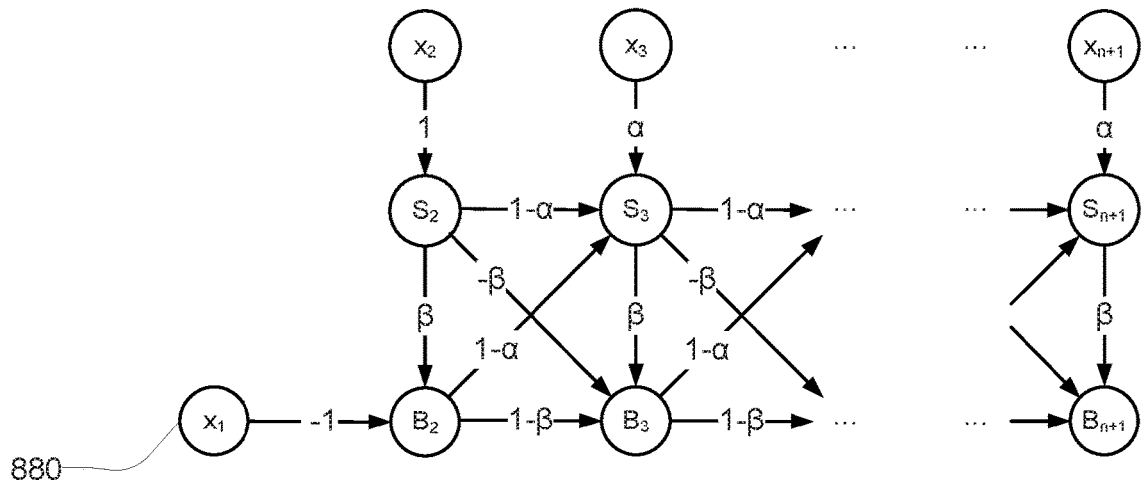

FIG. 8E shows the result of discarding the vertices for $S_1$ and $B_1$ and changing the weight on the edge from $x_2$ to $S_2$ from α to 1. The graph in FIG. 8E has a new trailing value $x_1$ at vertex 880, and the earliest level value and the earliest trend value influencing $S_{n+1}$ and $B_{n+1}$ are $S_2$ and B2, respectively. To remove the vertices for $S_1$ and $B_1$ and to add the vertex for new trailing value $x_1$, the instrumentation analysis system 100 performs the following calculations based on the updated influence terms:

$$S = S - x_1\frac{dS}{dB} + x_2\left(\alpha(1-\beta)\frac{dS}{dB} + (1-\alpha)\frac{dS}{dS}\right) \tag{11}$$

$$B = B - x_1\frac{dB}{dB} + x_2\left(\alpha(1-\beta)\frac{dB}{dB} + (1-\alpha)\frac{dB}{dS}\right) \tag{12}$$

If a new data value (e.g., $x_{n+1}$) is added before the trailing data value (e.g., $x_0$) is removed, the instrumentation analysis system 100 updates the influence terms based on this additional data value. This is because the window size has temporarily increased by one (until the trailing data value is removed), so the influence of the trailing data value on the updated level term $S_{n+1}$ and updated trend term $B_{n+1}$ has decayed. The formulas for updating the influence terms after adding a new data value are as follows:

$$\frac{dS}{dS} = (1-\alpha)\left(\frac{dS}{dS}_{prev} + \frac{dB}{dS}\right) \quad (13)$$

$$\frac{dS}{dB} = (1-\alpha)\left(\frac{dS}{dB}_{prev} + \frac{dB}{dB}\right) \quad (14)$$

$$\frac{dS}{dB} = \beta\left(\frac{dS}{dB} - \frac{dS}{dB}_{prev}\right) + (1-\beta)\frac{dB}{dB} \quad (15)$$

$$\frac{dB}{dS} = \beta\left(\frac{dS}{dS} - \frac{dS}{dS}_{prev}\right) + (1-\beta)\frac{dB}{dS} \quad (16)$$

To begin calculating a double exponential smoothed model for a time series, the instrumentation analysis system 100 initializes the level value S, the trend value B, and the trailing values $T_0$ and $T_1$ as NULL. The instrumentation analysis system 100 initializes the influence terms dS/dS, dB/dS, and dB/dB as 1, and the term dS/dB as 0. Until the number of values received for the time series exceeds the length of the moving window, additional data values are added to the calculation of S and B, but no influences from trailing data values are removed.

In some embodiments, the above algorithm is modified to handle nulls in the time series. Nulls are points in a time series in which a data value is expected but was not received. To handle a time series with nulls, the instrumentation analysis system 100 decays each data value according to its age, rather than according to the number of data values received after the data value. For example, if a portion of a time series includes a portion $x_{t-1}$, NULL, . . . NULL, $x_t$, with a number c nulls between $x_{t-1}$ and $x_t$, the weight of observation $x_{t-1}$ decays by a factor of $(1-\alpha)^{c+1}$. The algorithm described above is adjusted by setting the smoothing parameters based on any nulls between data values according to the following formulas:

$$\alpha(c)=1-(1-\alpha)^{c+1} \quad (17)$$

$$\beta(c)=1-(1-\beta)^{c+1} \quad (18)$$

In addition to adjusting the smoothing parameters, intervening nulls affect how the trend value is used in computation. Since $B_{t-1}$ is an estimate for the change per period, the formula for updating the level term accounts for increases in the periods during which nulls were observed. In particular, when c null values intervene between the most recent data value and the previous data value, formulas (1) and (2), used to add a new data point, are modified as follows:

$$S_t = \alpha(c)x_t + (1-\alpha(c))(S_{t-1} + (c+1)B_{t-1}) \quad (19)$$

$$B_t = \beta(c)\frac{s_t - s_{t-1}}{c+1} + (1-\beta(c)) \quad (20)$$

It is assumed that the number of consecutive nulls observed is less than the window size. If a window consists entirely of nulls, the instrumentation analysis system 100 re-initializes the level and trend values.

User Interface for Double Exponential Smoothing

Figure 9:
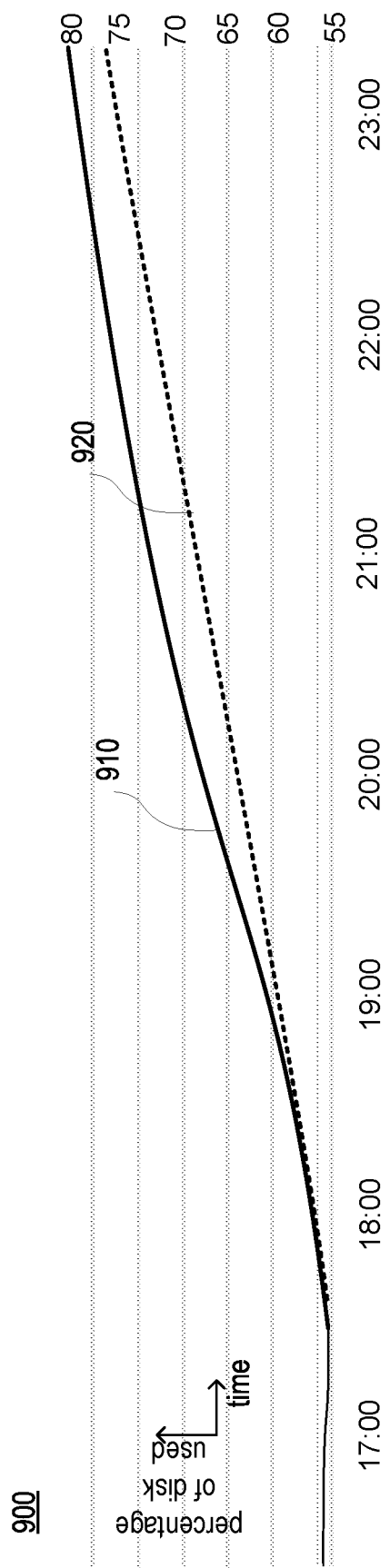
FIG. 9 shows a screenshot of a user interface displaying result of execution of a data stream language program using finite window double exponential smoothing, according to an embodiment.
Figure 11:
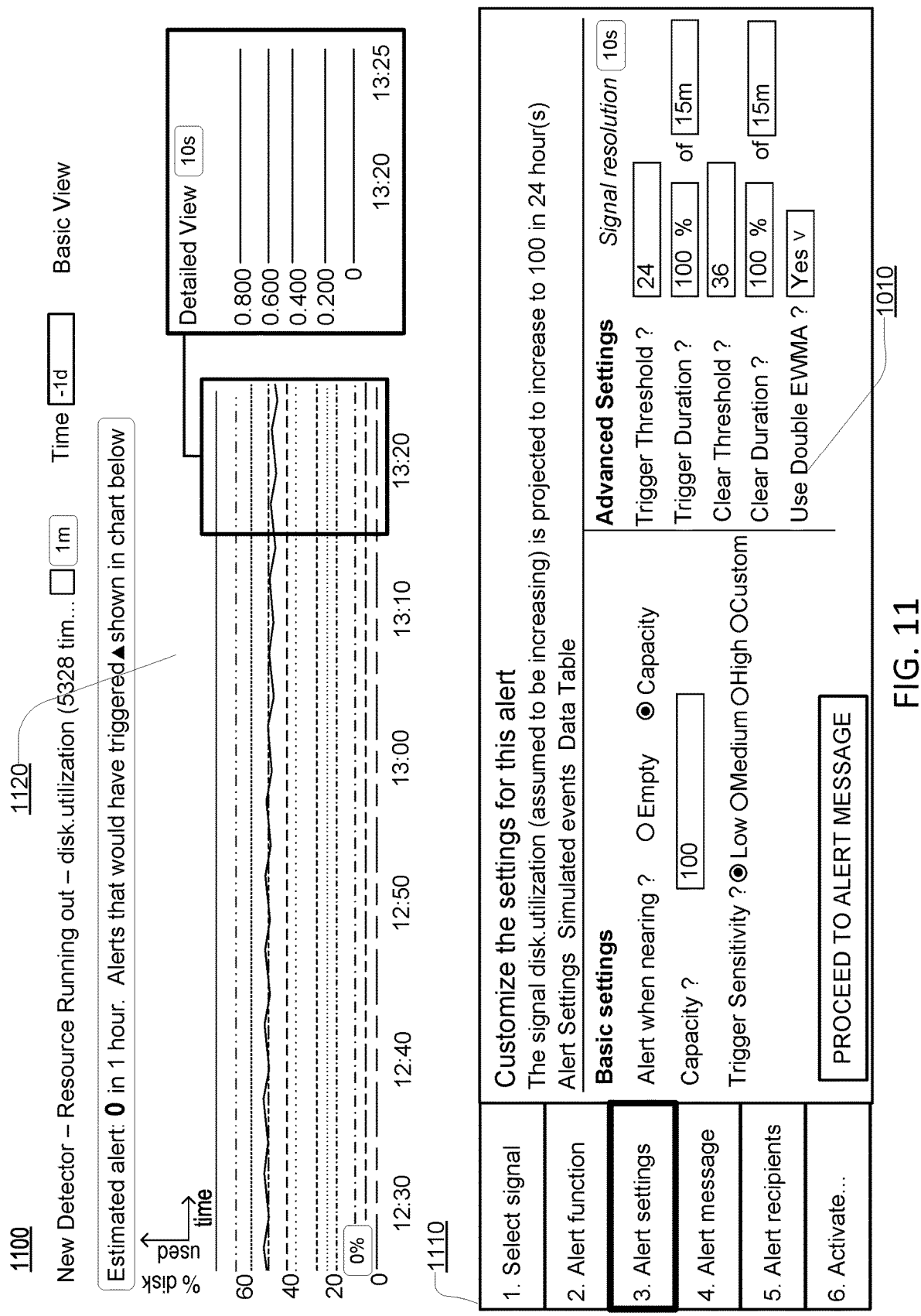
FIG. 11 shows a screenshot of a user interface allowing illustrating a workflow for using the exponentially weighted moving average function, according to an embodiment.

FIGS. 9-11 illustrate an example use case of a double exponential smoothing operator, according to an embodiment. A fundamental challenge in monitoring and maintaining modern infrastructure is capacity planning: an undersupply of resources can lead to performance issues or outages, while an oversupply can be expensive. Among the core infrastructure metrics, one of the basic capacity planning tasks is to monitor disk usage and alert when the resource "available disk" is running out (i.e., capacity needs to be added).

FIG. 9 shows a screenshot of a user interface 900 displaying a result of an execution of a data stream language program using finite window double exponential smoothing, according to an embodiment. The dotted line 920 represents disk used (as a percentage), and the solid line 910 is the 2-hour ahead forecast use finite window double exponential smoothing. An alert based on the 2-hour ahead forecast (i.e., trigger when disk used is forecasted to be above 75%) is generated sufficiently early to ensure that sufficient resources are available. For example, the alert generated according to the finite window double exponential smoothing forecast is generated earlier than an alert that triggers when disk used goes above 75%. When the increase to the disk used first arrives around 18:00, the forecast lags, because the forecast is based partially on an earlier segment of the window which is substantially flat. However, the upward trend continues, the forecast becomes bolder. By approximately 20:30, the forecast is fairly accurate.

FIG. 10 shows a screenshot of a user interface allowing easy access to the double exponentially weighted moving average function, according to an embodiment. The user selects a metric time series (here, disk.utilization), a Capacity (100), a desired warning in hours (24, "Trigger threshold"), and a number of hours that should be considered "safe" once the alert has triggered (36, "Clear threshold"). The "Trigger duration" and "Clear duration" fields specify how long the forecast must be in the triggered/clear state for the alert to be triggered or to clear. Selecting "Yes" for the widget 1010 (dropdown list) labelled "Use Double EWMA" uses the double exponential smoothing algorithm to construct a forecast.

FIG. 11 shows a screenshot of a user interface illustrating a workflow for using the double exponentially weighted moving average function, according to an embodiment. The user interface 1100 shown in FIG. 11 illustrates the context in which the user interface 1000 shown in FIG. 10 appears. The user interface 1100 shows widgets 1110 for specifying and controlling the workflow on the left (select signal, alert function, alert settings, and other actions that a user can take using the user interface) and a visual representation 1120 of the time series being monitored in the top half of the panel.

It should be understood that the finite window double exponential smoothing process described herein can be used for other applications. For example, other aspects of instrumented software can be monitored using a double exponentially smoothed model. The double exponential smoothing algorithm can be applied to any time series when real-time or near-real time results are desired.

ALTERNATIVE EMBODIMENTS

It is to be understood that the Figures and descriptions of the present invention have been simplified to illustrate elements that are relevant for a clear understanding of the invention, while eliminating, for the purpose of clarity, many other elements found in a typical system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise. Upon reading this disclosure, those of skill in the art will appreciate still additional alternative structural and functional designs for a system and a process for generating reports based on instrumented software through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for allocating system resources to instrumented software, the method comprising:
    receiving a time series comprising a plurality of data values from an instance of the instrumented software executing on an external system, the plurality of data values corresponding to a metric related to computing resources being used by the instrumented software;
    storing a level value representing a current estimate of the time series based on the data values for the time series in a window of time, the window comprising a leading data value, a first trailing data value, and a second trailing data value, the leading data value comprising a most recent value;
    storing a trend value representing a trend in the time series determined based on the data values in the window;
    updating the level value to add an influence of the most recent data value and, in response to a number of data values received exceeding an expected number of data values for a length of the window, removing an influence of the first trailing data value and the second trailing data value based on a first set of influence terms,
    wherein the first set of influence terms indicate an influence of: an earliest level value in the window of time on a current level value, and an earliest trend value in the window of time on the current level value;
    updating the trend value to add an influence of the most recent value and, in response to the number of data values received exceeding the expected number of data values for the length of the window, removing an influence of the first trailing data value and the second trailing data value based on a second set of influence terms,
    wherein the second set of influence terms indicate an influence of: the earliest level value in the window of time on a current trend value, and the earliest trend value in the window of time on the current trend value;
    generating a forecast for the time series based on the updated level value and the updated trend value;
    causing display of the forecast on a user interface (UI); and
    adjusting the computing resources of the instrumented software based on the forecast meeting a threshold, wherein the adjusting includes increasing available computing resources in the instrumented software by allocating additional computing resources of the external system to the instrumented software and executing the instrumented software using the adjusted computing resources.

2. The computer-implemented method of claim 1, further comprising, in response to receiving the most recent value of the plurality of data values in the time series:
    updating the first set of influence terms and the second set of influence terms to indicate influences of a second earliest level value and a second earliest trend value on the level value and the trend value.

3. The computer-implemented method of claim 1, wherein updating the level value and updating the trend value are further based on a plurality of influence terms including the first set of influence terms and the second set of influence terms.

4. The computer-implemented method of claim 1, wherein updating the level value to add the influence of the most recent value comprises:
    calculating the updated level value from a most recent prior level value of the level values and a first smoothing parameter, wherein the first smoothing parameter comprises a first range of data values, the most recent data value, and/or the trend value.

5. The computer-implemented method of claim 1, wherein updating the trend value to add the influence of the most recent value comprises:
    calculating the updated trend value from a prior trend value based on the prior trend value and a second smoothing parameter, wherein the second smoothing parameter comprises a second range of values, a most recent prior level value of the level values, and/or the updated level value.

6. The computer-implemented method of claim 1, wherein the time series comprises a plurality of nulls between two consecutive data values of the plurality of data values, the plurality of nulls indicating a period of time for which data values for the time series were not received.

7. The computer-implemented method of claim 1, wherein updating the level value to add an influence of the most recent value and to remove an influence of the trailing value comprises:
    decaying an influence of each data value in the window according to its age in the time series.

8. A computing device, comprising:
    a processor; and
    a non-transitory computer-readable medium having stored thereon instructions that, when executed by the processor, cause the processor to perform operations for allocating system resources to instrumented software, including:
    receiving a time series comprising a plurality of data values from an instance of instrumented software executing on an external system, the plurality of data values corresponding to a metric related to computing resources being used by the instrumented software;
    storing a level value representing a current estimate of the time series based on the data values for the time series in a window of time, the window comprising a leading data value, a first trailing data value, and a second trailing data value, the leading data value comprising a most recent value;
    storing a trend value representing a trend in the time series determined based on the data in the window;
    updating the level value to add an influence of the most recent data value and, in response to a number of data values received exceeding an expected number of data values for a length of the window, removing an influence of the first trailing data value and the second trailing data value based on a first set of influence terms,
    wherein the first set of influence terms indicate an influence of: an earliest level value in the window of time on a current level value, and an earliest trend value in the window of time on the current level value;
    updating the trend value to add an influence of the most recent value and, in response to the number of data values received exceeding the expected number of data values for the length of the window, removing an influence of the first trailing data value and the second trailing data value based on a second set of influence terms,
    wherein the second set of influence terms indicate an influence of: the earliest level value in the window of time on a current trend value, and the earliest trend value in the window of time on the current trend value;
    generating a forecast for the time series based on the updated level value and the updated trend value;
    causing display of the forecast on a user interface (UI); and
    adjusting the computing resources of the instrumented software based on the forecast meeting a threshold, wherein the adjusting includes increasing available computing resources in the instrumented software by allocating additional computing resources of the external system to the instrumented software and executing the instrumented software using the adjusted computing resources.

9. The computing device of claim 8, further comprising, in response to receiving the most recent value of the plurality of data values in the time series, operations including:
    updating the first set of influence terms and the second set of influence terms to indicate influences of a second earliest level value and a second earliest trend value on the level value and the trend value.

10. The computing device of claim 8, wherein updating the level value and updating the trend value are further based on a plurality of influence terms including the first set of influence terms and the second set of influence terms.

11. The computing device of claim 8, wherein updating the level value to add the influence of the most recent value comprises operations including:
    calculating the updated level value from a most recent prior level value of the level values and a first smoothing parameter, wherein the first smoothing parameter comprises a first range of data values, the most recent data value, and/or the trend value.

12. The computing device of claim 8, wherein updating the trend value to add the influence of the most recent value comprises operations including:
    calculating the updated trend value from a prior trend value based on the prior trend value and a second smoothing parameter, wherein the second smoothing parameter comprises a second range of values, a most recent prior level value of the level values, and/or the updated level value.

13. The computing device of claim 8, wherein the time series comprises a plurality of nulls between two consecutive data values of the plurality of data values, the plurality of nulls indicating a period of time for which data values for the time series were not received.

14. The computing device of claim 8, wherein updating the level value to add an influence of the most recent value and to remove an influence of the trailing value comprises operations including:
    decaying an influence of each data value in the window according to its age in the time series.

15. A non-transitory computer-readable medium having stored thereon instructions that, when executed by one or more processors, cause the one or more processors to perform operations for allocating system resources to instrumented software, including:
    receiving a time series comprising a plurality of data values from an instance of instrumented software executing on an external system, the plurality of data values corresponding to a metric related to computing resources being used by the instrumented software;
    storing a level value representing a current estimate of the time series based on the data values for the time series in a window of time, the window comprising a leading data value, a first trailing data value, and a second trailing data value, the leading data value comprising a most recent value;

storing a trend value representing a trend in the time series determined based on the data values in the window;

updating the level value to add an influence of the most recent data value and, in response to a number of data values received exceeding an expected number of data values for a length of the window, removing an influence of the first trailing data value and the second trailing data value based on a first set of influence terms, wherein the first set of influence terms indicate an influence of: an earliest level value in the window of time on a current level value, and an earliest trend value in the window of time on the current level value;

updating the trend value to add an influence of the most recent value and, in response to the number of data values received exceeding the expected number of data values for the length of the window, removing an influence of the first trailing data value and the second trailing data value based on a second set of influence terms, wherein the second set of influence terms indicate an influence of: the earliest level value in the window of time on a current trend value, and the earliest trend value in the window of time on the current trend value;

generating a forecast for the time series based on the updated level value and the updated trend value;

causing display of the forecast on a user interface (UI); and adjusting the computing resources of the instrumented software based on the forecast meeting a threshold, wherein the adjusting includes increasing available computing resources in the instrumented software by allocating additional computing resources of the external system to the instrumented software and executing the instrumented software using the adjusted computing resources.

16. The non-transitory computer-readable medium of claim 15, further comprising, in response to receiving the most recent value of the plurality of data values in the time series, operations including:

the first set of influence terms and the second set of influence terms to indicate influences of a second earliest level value and a second earliest trend value on the level value and the trend value.

17. The non-transitory computer-readable medium of claim 15, wherein updating the level value and updating the trend value are further based on a plurality of influence terms including the first set of influence terms and the second set of influence terms.

18. The non-transitory computer-readable medium of claim 15, wherein updating the level value to add the influence of the most recent value comprises operations including:

calculating the updated level value from a most recent prior level value of the level values and a first smoothing parameter, wherein the first smoothing parameter comprises a first range of data values, the most recent data value, and/or the trend value.

19. The non-transitory computer-readable medium of claim 15, wherein updating the trend value to add the influence of the most recent value comprises operations including:

calculating the updated trend value from a prior trend value based on the prior trend value and a second smoothing parameter, wherein the second smoothing parameter comprises a second range of values, a most recent prior level value of the level values, and/or the updated level value.

20. The non-transitory computer-readable medium of claim 15, wherein the time series comprises a plurality of nulls between two consecutive data values of the plurality of data values, the plurality of nulls indicating a period of time for which data values for the time series were not received.

* * * * *